A. LEE.
PORTABLE POWER TRANSMISSION.
APPLICATION FILED OCT. 2, 1912.
1,089,485.
Patented Mar. 10, 1914.
3 SHEETS—SHEET 3.
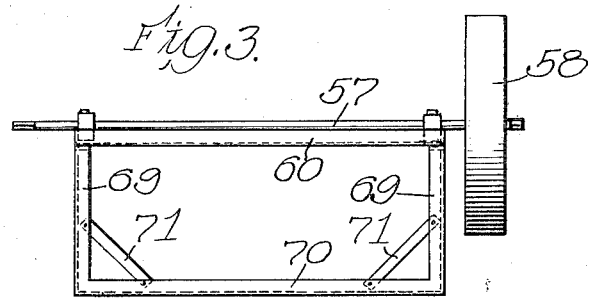
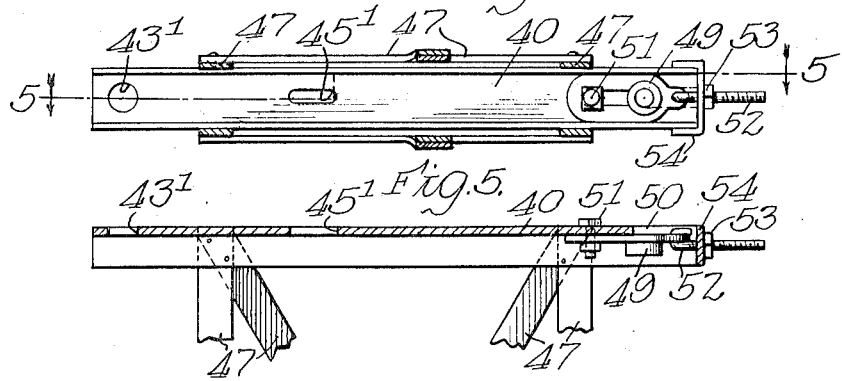
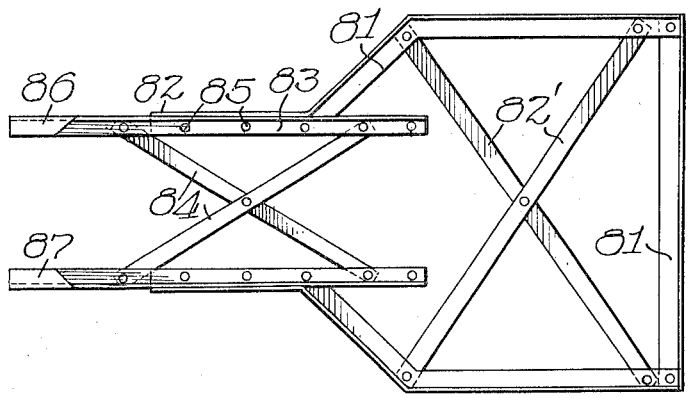 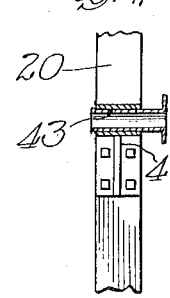 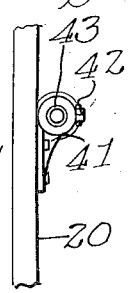
Witnesses:
G. W. Domarus Jr.
R. Bauerle
Inventor:
Arthur Lee
By Hill & Hill
Attys.

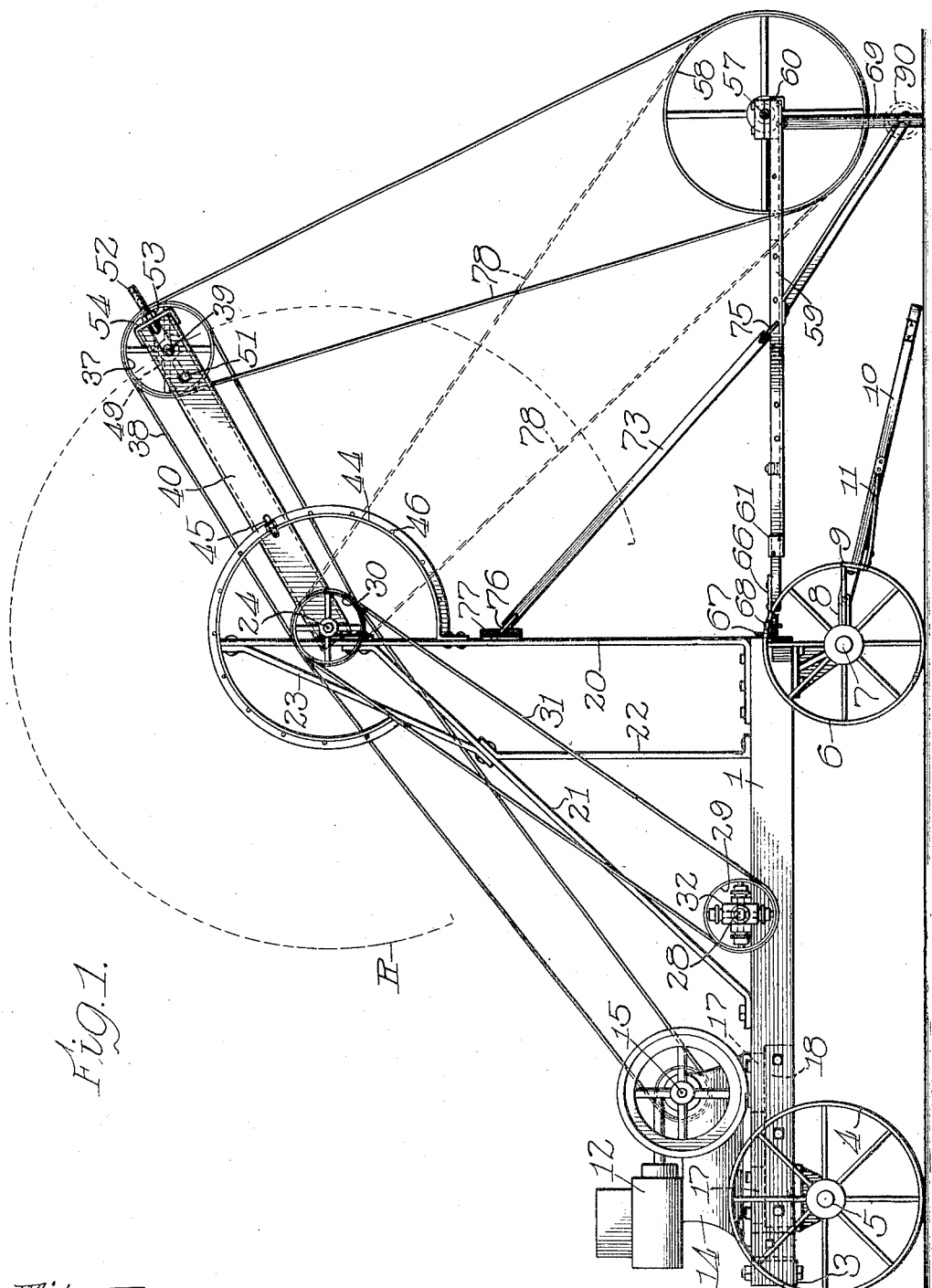

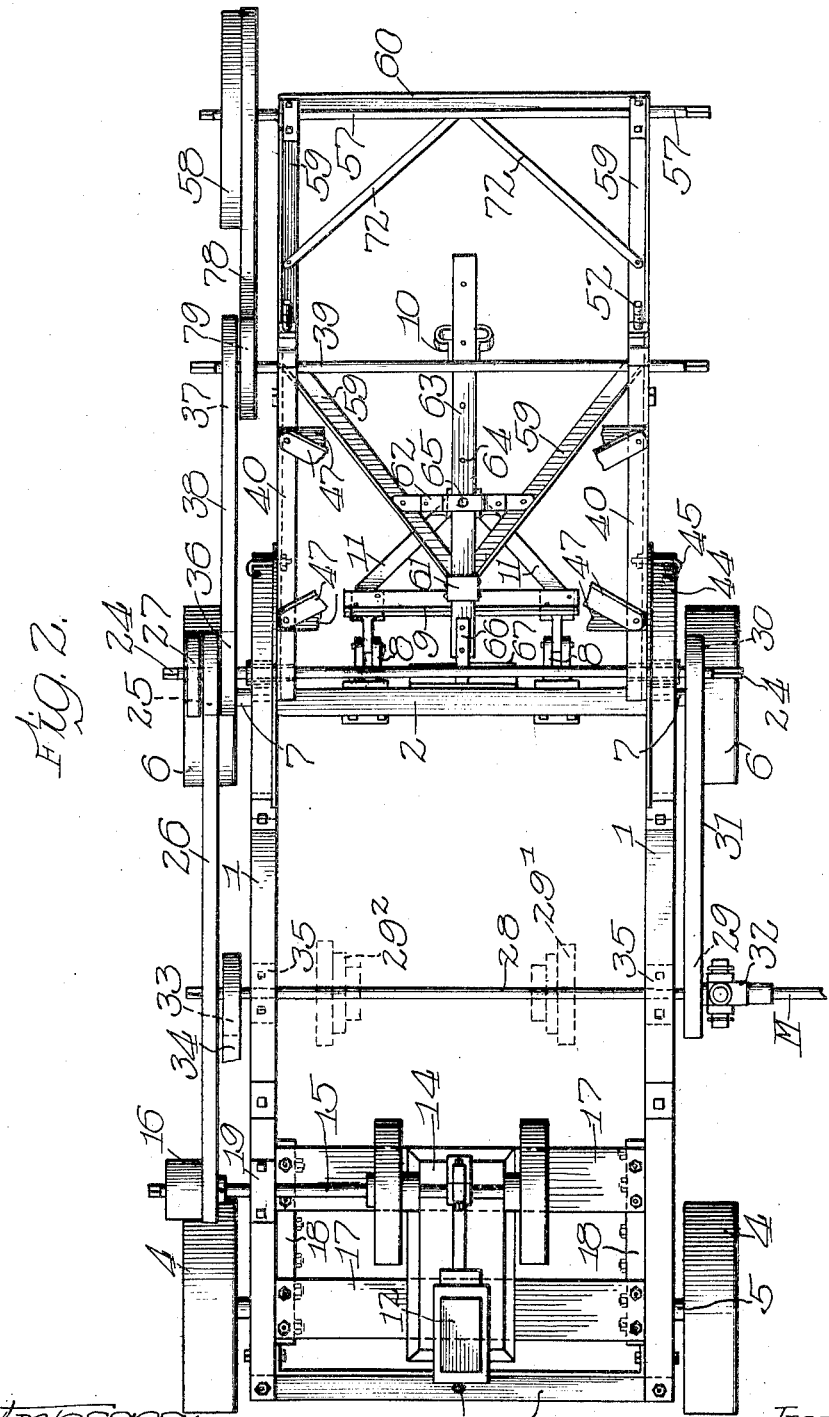

UNITED STATES PATENT OFFICE.

ARTHUR LEE, OF UNION HILL, ILLINOIS.

PORTABLE POWER TRANSMISSION.

1,089,485.          Specification of Letters Patent.      Patented Mar. 10, 1914.

Application filed October 2, 1912. Serial No. 723,534.

*To all whom it may concern:*

Be it known that I, ARTHUR LEE, a citizen of the United States, residing at Union Hill, in the county of Kankakee and State of Illinois, have invented certain new and useful Improvements in Portable Power Transmission, of which the following is a description.

My invention belongs to that general class of devices for transmitting power, and relates particularly to a portable power transmission for transmitting power from a suitable source of energy to the desired machine or machines.

The device is particularly adapted and designed for use on farms for driving different kinds of machinery, as for example, churns, washing machines, pumps, grindstones, or similar tools and appliances, shellers, etc., and the various other machines that are commonly used upon farms. With it a single source of power, suitably mounted upon a truck, as for example, a suitable gas engine, or the equivalent, may be transported from place to place about the farm to wherever it is desired to operate a piece of apparatus, or several machines, as the case may be. The engine is mounted upon a truck, together with a number of shafts, pulleys, etc., from which power may be transmitted, it being only necessary to block the truck or vehicle in the desired location and connect the desired shaft to the desired piece of machinery, either by a belt connection, universal coupling, or the like.

My invention has among its objects the production of a device of the kind described that is simple, convenient, efficient and satisfactory, that may be manufactured at comparatively small cost, that will not easily get out of order, and that may be used wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a side elevation of my device equipped with an auxiliary detachable frame therefor. Fig. 2 is substantially a top elevation of the same. Fig. 3 is an end elevation of the auxiliary attachment. Fig. 4 is a sectional view of a portion of the supporting feature, adjustably carrying one of the shafts. Fig. 5 is a sectional view of the same taken substantially on line 5, 5 of Fig. 4. Fig. 6 is a top elevation of a modified auxiliary attachment. Fig. 7 is a sectional view of one of the parts, and Fig. 8 is a side elevation of the same.

Referring to the drawings, 1, 1 represents the side pieces of a suitable truck frame, which are connected by end pieces 2 and 3. The frame of the truck is carried by wheels 4 and 6, which carry the axles 5 and 7, the front axle being pivotally connected to the frame, so that it may be turned in the usual manner. I have not considered it necessary to illustrate the truck frame in detail, nor the manner of securing the axles to the same, since this may be modified as desired. The front axle or bolster may be provided with an extension or hinge parts 8, to which is secured a cross-bar 9, provided with a handle or tongue 10, the same being braced by braces 11, or the equivalents.

Preferably upon the rear of the truck, I mount a source of power, as for example, the gas engine 12, carried by a suitable base 14. The gas engine 12 is operatively connected with and arranged to drive a driving shaft 15 and driving pulley 16 secured thereto. The engine may be supported from the truck frame in any suitable manner, as shown, it is mounted upon cross pieces 17 carried by the brackets 18 on the sides 1, 1 of the frame of the truck. A bracket 19 (see Fig. 2) is preferably provided for supporting the end of the shaft 15. It is, of course, obvious that the shaft 15 may be extended on the opposite side of the truck also and a driving belt placed at that end. The frame may be braced in any suitable manner, and may be provided with suitable tool boxes (not shown) or other equipment. Upon the opposite end of the truck is mounted a frame consisting of the uprights 20, braced by the struts or brace members 21, 22 and 23. The frame and braces may be made of angle iron or the equivalent. Carried by the upright frame mentioned is a shaft 24, the same being driven from the driving pulley 16, through a pulley 25 secured upon the shaft, and a suitable belt 26,—27 being a loose pulley upon which the belt may be shifted when it is desired to stop the shaft 24. Shaft 24 may be termed a driven or transmitting shaft. The manner of supporting or securing the shaft to the pulley frame will be more fully described hereafter. I also provide another shaft 28 suitably mounted upon the frame, as shown by brackets 35, which is driven by a belt 31 passing over the pulleys 29 and 30, which are secured to the shafts 28 and 24 respectively. The power may be transmitted from the shaft 28, to a machine driving shaft or element M (see Fig. 2) by a universal joint or coupling 32. I show the shaft 28 also provided with a pulley 33, which may be arranged to drive a belt 34, or a sprocket chain or the equivalent, for driving any desired machine. If desired, a cone pulley 29' (see Fig. 2, in which the same is shown in dotted lines) may be provided upon the shaft 28, which may be driven from a similar pulley (not shown) upon the shaft 24, so that the shaft 28 may be driven at different speeds. In this connection, I might also mention that instead of driving the shaft 28 from the shaft 24, it might be driven through a cone pulley $29^2$ (shown in dotted lines in Fig. 2) from a belt passing over a similarly formed pulley upon the shaft 15 (not shown).

Inasmuch as the position of the machine shaft to be driven may vary relative to the truck and its shafting, I also provide an adjustably supported shaft 39. It frequently happens that the machine to be driven may be arranged upon a platform, as for example, upon a porch or within a house, in which case the height of the machine from the ground may vary, depending upon where the machine is placed. For this reason I have provided the adjustable shaft. Referring particularly to Figs. 1, 2, 4 and 5, the shaft 39 is carried by arms 40, which are preferably braced and secured together by the brace members 47. Arms 40 are provided with holes 43' of a size to fit over a collar 43 at each side of the upright frame (see Figs. 7 and 8) which are carried by brackets 41. The collars or bushings 43 are locked in position by bolts 42, or their equivalents, the bracket being open so that the bushings may be slipped in or out as desired, the bolts, however, locking them in position. The shaft 24 extends through the collars 43, and is supported by the same and by the brackets 41. This construction affords a very simple and inexpensive bearing for the shaft 24, which may be renewed when worn at small expense. It may be mentioned at this time that all of the bearings may be constructed in this manner if desired. By securing the arms 40 upon the ends of the bushings 43 there is no friction or binding of the same upon the shafts 24. The arms 40 are maintained in the desired position by bolts 45 passing through the same, and in engagement with substantially a ring member 44 arranged at each side of the upright frame. The bolts 45 may pass through the bolt holes 46 in the ring members and engage the edge, or if it is desired to support the arms at points intermediate the holes 46, the hooks may be turned and extend on the inside of the ring, hooking over the flange in a similar manner, but from the opposite side.

The shaft 39 may be secured to the ends of the arms in any satisfactory manner. As shown, it is adjustably secured to the same so that the tension upon the belt may be made as desired. For this purpose I have shown two adjustable bearing members 49, the arms being slotted at 50, so that the shaft may move in or out relative the pivotal support of the arms 40. The members 49 are secured in position by bolts 51, and by hooked members 52, which extend through end plates 54, 53 being a nut for each bolt, by means of which the tension may be regulated. Any of the various shafts mentioned may be connected to the machinery to be run by belts, sprocket chains, or by the universal couplings previously mentioned and illustrated in the drawings. The shaft 39 is driven by a belt 38 passing over pulleys 36 and 37, secured to the shaft 24 and to shaft 39 respectively.

As previously mentioned, I provide an auxiliary detachable part consisting of a shaft and support, etc., which may be used whenever an additional driving shaft is required. As shown, this consists of a shaft 57 arranged to be driven by a pulley 58, or its equivalent. The shaft 57 is carried by a suitable part mounted upon a frame 59, 60, which is suitably connected with the truck frame. Referring particularly to Figs. 1, 2 and 3, the frame part 59, 60 is supported by legs 69, preferably connected at their lower ends by a cross piece 70, 71 being braces. The parts 59 and 60 are braced by braces 72. The parts 59 are provided with substantially a collar 61, or yoke, and a cross bar 62, having a yoke through which extends a bar or reach 63, having holes 64 therein, through which the pin 65 carried by the cross piece 62 may pass. The end of the bar 63 is preferably provided with a strap 66 arranged to be supported by a small angle iron 67, or the equivalent, on the end 2 of the truck frame, the parts being secured together by bolt or pin 68, or the equivalent. When in use the auxiliary frame may also be braced by bracing members 73 arranged to be secured to the frame part 59 and to the uprights 20 at points 75 and 76. A plurality of holes are provided in the part 59 to afford adjustment when the part 59 and the bar 63 are adjusted. The braces 73 may be braced in any suitable manner, if so desired. The pulley 58 may be driven by a belt 78. This belt may be driven by a pulley 79 upon the shaft 39, or the belt 38 may be removed from the pulley 36 and the same driven from the pulley 36. (See dotted line Fig. 1). It will be noted by referring to Fig. 2, that the bar 3 of the truck frame is provided with a hole 67'. This is so the auxiliary frame 59, 60, etc., may be attached to the opposite or engine end of the truck, if desired, the pin 68 in that case being inserted in the hole 67' on truck frame end 3.

In Fig. 6, as shown, I modify the construction of the auxiliary frame, in which 81 is the frame part having the extended ends 82, the frame being braced by braces 82'. Adjustably secured to this part is another frame consisting of the side bars 83 and braces 84. The frame parts are preferably made of angle iron, the parts 83 being smaller than the parts 81. The parts are secured together by bolts 85, a plurality of bolt holes being provided in the parts 83. The ends of the bars 83 are preferably formed by bending the side of the angle over parallel with the bottom and cutting out the connection between the two near the end, so that the two sides of the angle are parallel to embrace an angle iron secured to the truck frame. I have not considered it necessary to show the angle iron.

From the above description it will be seen that the device is suitable for transmitting power from any source of energy to almost any kind of machinery, particularly farm machinery. The device being portable, it may be taken about the farm to the machinery to be driven. It will be noted by referring particularly to Fig. 1, that the adjustable supporting shaft 39 may be arranged in almost any position, substantially within the limits indicated by the dotted lines, indicated by the reference character R.

Having thus described my invention, it is obvious that various immaterial modifications may be made in the same without departing from the spirit of my invention, hence I do not wish to be understood as limiting myself to the exact form, construction or combination of parts herein shown and described, or uses mentioned.

What I claim as new and desire to secure by Letters Patent is:—

1. In a device of the kind described and in combination, with a suitable truck frame, an upright frame mounted thereon, a shaft carried by said upright frame, an adjustable frame pivotally mounted upon said shaft, means for maintaining said adjustable frame in the desired position relative to said upright frame, and a rotatable shaft carried by said adjustable frame proximate the free end thereof.

2. In a device of the kind described and in combination, a suitable truck, a power element mounted thereon, a driving shaft operatively connected therewith, an upright frame mounted upon said truck, a driven shaft, and means for adjustably supporting the same upon said upright frame, comprising a pair of arms adjustably secured to said driven shaft, and means for operatively connecting said shafts.

3. The combination of a suitable truck frame, and supporting wheels therefor, an upright frame mounted upon said truck frame, bracing means for said upright frame, a shaft rotatably carried by said upright frame, an adjustable frame mounted upon said shaft, means carried by said upright frame at each side thereof for supporting said adjustable frame and maintaining the same in the desired operative position, and a rotatable shaft adjustably carried by said adjustable frame proximate the free end thereof.

4. In a device of the kind described and in combination, a suitable truck frame and supporting wheels therefor, an engine mounted proximate one end of said truck, an upright frame mounted proximate the opposite end of said truck provided with a frame part pivotally secured thereto, means for maintaining said pivotally connected part in the desired position, a driving shaft oppositely connected with said engine, a driven shaft carried by said upright, means for operatively connecting said shafts, said driven shaft mounted at the center of pivotal connection of said adjustable frame part, a shaft carried proximate the end of said adjustable frame part, and means for operatively connecting said last mentioned shafts.

5. In a device of the kind described and in combination, a truck frame provided with supporting wheels therefor, an engine mounted proximate one end of said truck frame, a driving shaft operatively connected with said engine, an upright frame mounted proximate the opposite end of said truck frame, a transmitting shaft carried by said upright frame, a third shaft adjustably carried by said frame, a fourth shaft arranged between said driving frame and the engine, and means for operatively connecting all of said shafts with said driving shaft, an auxiliary frame detachably secured to said truck frame, a shaft carried by said detachable frame, means for operatively connecting said shaft with any of said first mentioned shafts.

6. In a device of the kind described and in combination, a truck frame provided with supporting wheels therefor, an engine mounted proximate one end of said truck frame, a driving shaft operatively connected with said engine, an upright frame mounted proximate the opposite end of said truck frame, a transmitting shaft carried by said upright frame, a third shaft adjustably carried by said frame, a fourth shaft arranged between said driving frame and the engine, and means for operatively connecting all of said shafts with said driving shaft, an auxiliary frame detachably secured to said truck frame, a shaft carried by said detachable frame, means for operatively connecting said shaft with any of said first mentioned shafts, and means for maintaining said detachable frame in operative relation with said truck frame.

7. In a device of the kind described and in combination, a truck frame, and supporting wheels therefor, a source of power mounted upon said frame, a plurality of power transmitting shafts mounted upon said truck, an auxiliary detachable frame provided with supporting legs and with means for adjustably and detachably securing the same to said truck frame, braces arranged between said truck frame and said detachable frame, a shaft arranged upon said detachable frame, and means for operatively connecting the same with one of said power transmitting shafts.

8. In a device of the kind described and in combination, a truck frame, an internal combustion engine mounted upon said frame proximate one end thereof, a driving shaft operatively connected with said engine, an upright frame secured to the said truck frame at the other end thereof, and means for bracing the said frame, a bracket secured to said frame on each side thereof proximate the upper end, a collar carried by each of said brackets and each projecting beyond the side of its respective bracket, a shaft rotatably carried by said collars, an adjustable frame part pivotally secured to the projecting part of said collars, means for locking said adjustable frame part in the desired position, a shaft rotatably carried at the free end of said adjustable frame part, means for operatively connecting the said shafts with said driving shaft, an auxiliary frame part, means for adjustably securing the same to one end of said truck frame, a shaft rotatably carried by said auxiliary frame part, and means for operatively connecting the same with one of said other shafts.

In testimony whereof, I have hereunto signed my name in the presence of two subscribing witnesses.

ARTHUR LEE.

Witnesses:
  A. J. WAGNER,
  FRED H. WOOD.